Figure 1:
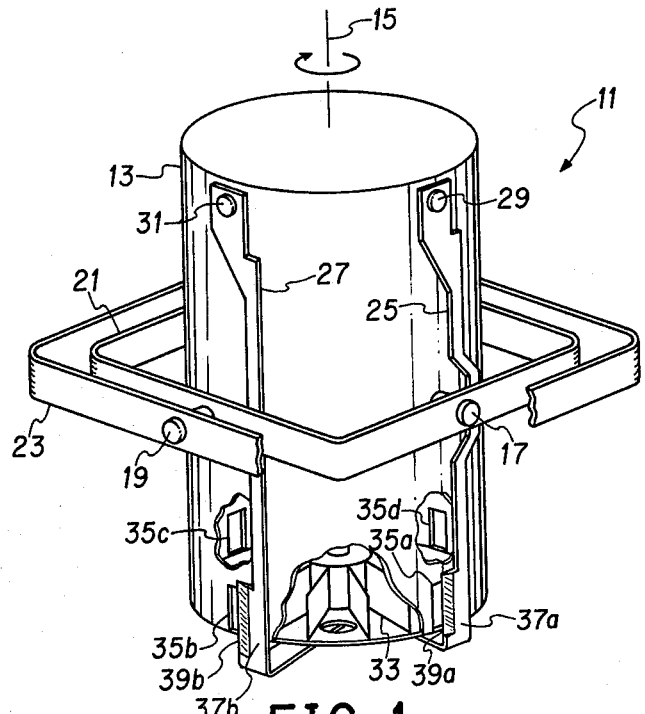

United States Patent [19]

Sholes

[11] 4,088,031

[45] May 9, 1978

[54] AIR ERECTED GYRO

[75] Inventor: Leonard D. Sholes, Marion, Iowa

[73] Assignee: Rockwell International Corporation, El Segundo, Calif.

[21] Appl. No.: 764,492

[22] Filed: Jan. 31, 1977

[51] Int. Cl.² .................. G01C 19/30; G01C 19/52; G01C 19/44

[52] U.S. Cl. .................................. 74/5.43; 74/5.8; 74/5.6 B

[58] Field of Search ............... 74/5 R, 5.4, 5.41, 5.43, 74/5.45, 5.5, 5.6 R, 5.6 B, 5.6 C, 5.7, 5.8, 5.9, 5.44

[56] References Cited

U.S. PATENT DOCUMENTS

| Re. 23,291 | 11/1950 | Braddon | 74/5.43 X |
|---|---|---|---|
| 2,015,650 | 10/1935 | Bates | 74/5.43 X |
| 2,242,806 | 5/1941 | Wunsch | 74/5.41 X |
| 2,916,918 | 12/1959 | Jones | 74/5.44 X |
| 3,310,987 | 3/1967 | Huizinga et al. | 74/5.5 X |

FOREIGN PATENT DOCUMENTS 602,235   5/1948   United Kingdom .................. 74/5.41

OTHER PUBLICATIONS

Collins Instruction Book on 332D-12 Vertical Gyro, Drawing p. 7, Feb. 1, 1975.

Primary Examiner—Samuel Scott
Assistant Examiner—Don E. Ferrell
Attorney, Agent, or Firm—Terry M. Blackwood; Robert J. Crawford; L. Lee Humphries

[57] ABSTRACT

An air erected gyro includes an erection-force producing air stream and gravity-responsive valve means whose gate portion is movable across the air stream so as to vary the erection force magnitude. Also included is a compensator means connected for movement with the gate and for also confronting the air stream so as to at least partially counteract air stream induced horizontal coercive effects on the valve means position.

9 Claims, 14 Drawing Figures

U.S. Patent  May 9, 1978  Sheet 1 of 4  4,088,031

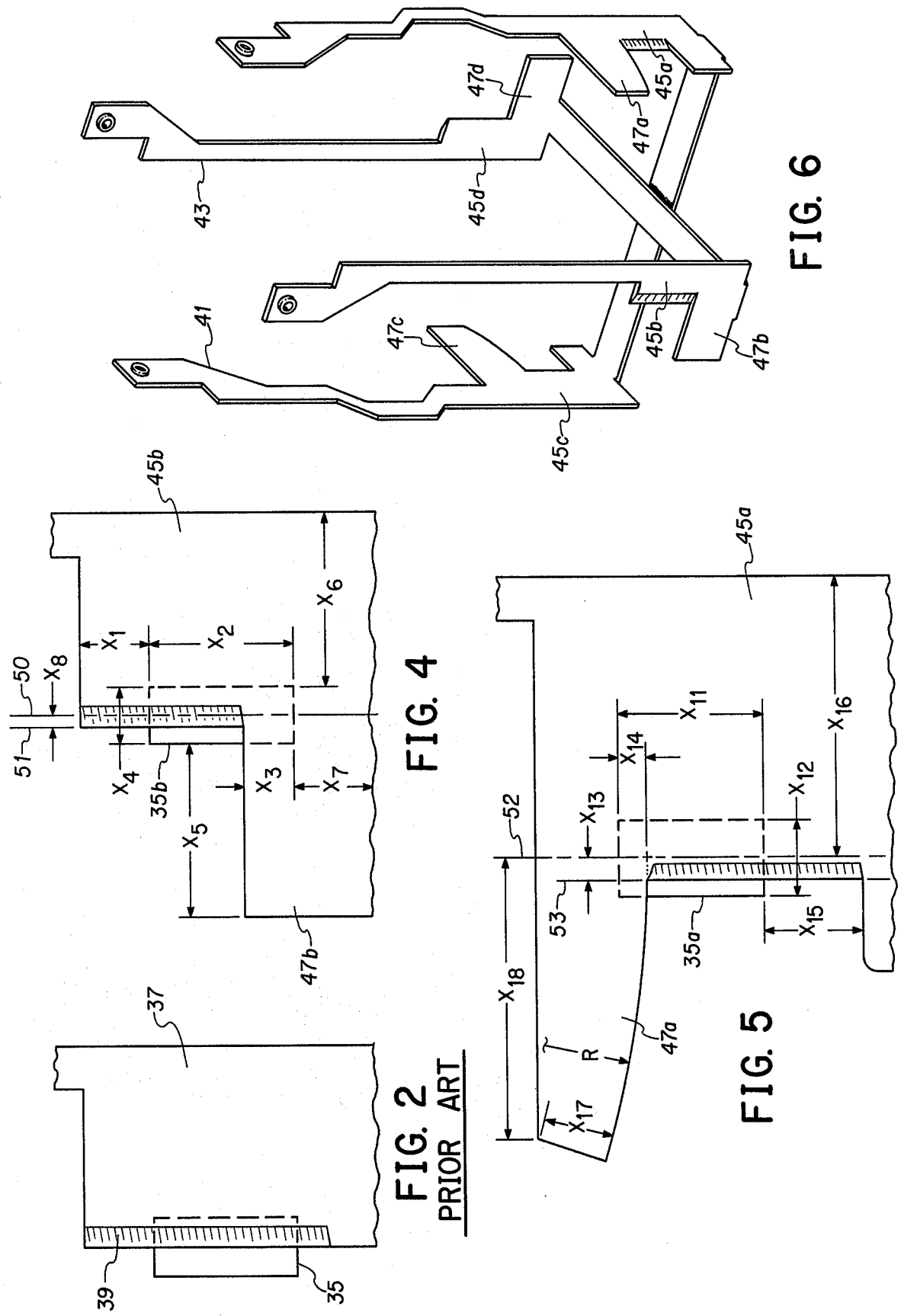

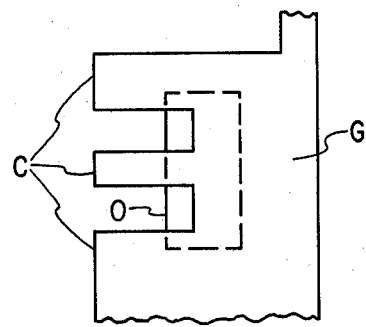
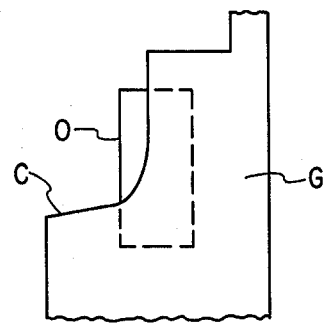
FIG. 9  FIG. 10
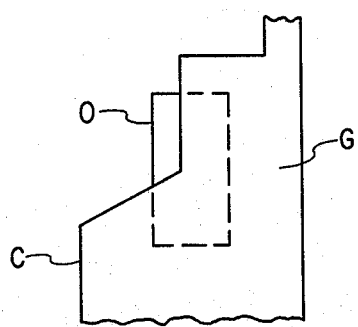
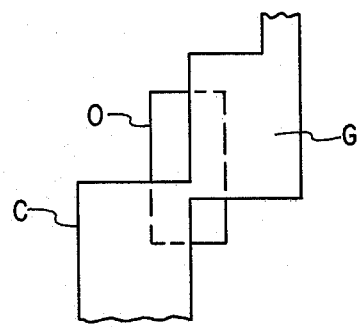
FIG. 11  FIG. 12
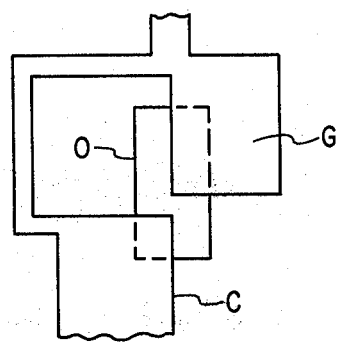
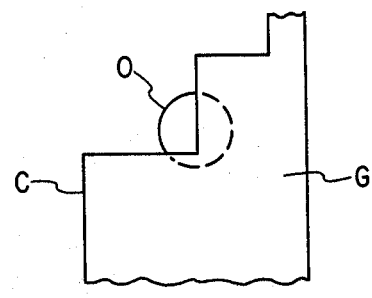
FIG. 13  FIG. 14

AIR ERECTED GYRO

This invention relates generally to gyros and more particularly to air erected gyros.

A typical air erected vertical gyro utilizes an orthogonally arranged pair of substantially U-shaped pendulous valve assemblies to establish vertical relative to the earth. Each valve assembly has one degree of freedom relative to the gyro spin axis and each includes a pair of valve gates for controlling air flow. More particularly the gyro "torquer" mechanism comprises four air streams emerging from the gyro rotor housing at 90° spatial intervals, each air stream being substantially at 90° relative to the spin axis and each stream being arranged to impinge on one of the free swinging valve gates. The amount of air flow is controlled by the free swinging gates, and the controlled air flow results in controlled reaction forces which cause the gyro spin axis to erect to the vertical position as sensed and established by the vertical-seeking valve assemblies.

One source of vertical error in such gyros is the coercive effect of the air streams on the gates. This air coercion effect prevents the vertical-seeking valve assemblies from swinging absolutely free in the earth's gravity and results in an erroneous vertical reference. One approach to reducing the error arising from air coercion has been to increase pendulosity, where pendulosity = $m \cdot d_{cm}$, where $m$ = mass of the pendulum and $d_{cm}$ = distance from the axis of pendulum rotation to the center of mass of the pendulum. However, pendulosity is also a source of error and thus increased pendulosity is an undesirable solution.

Figure 3:
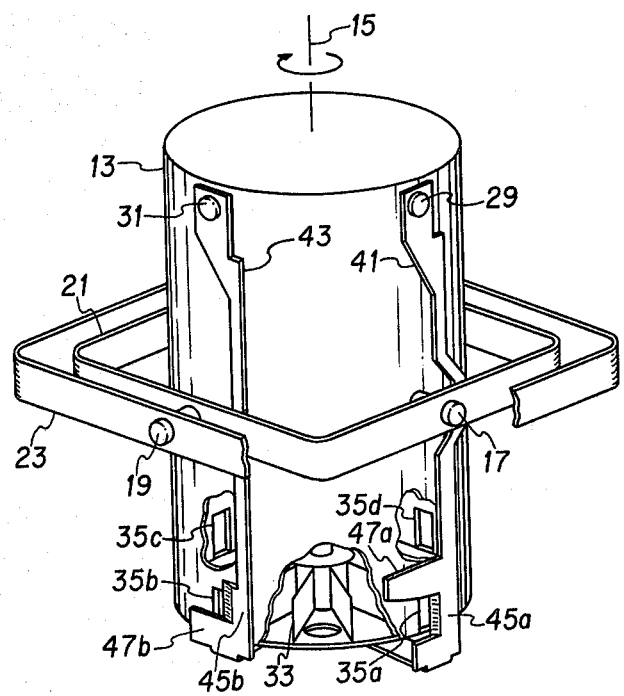
Figure 7:
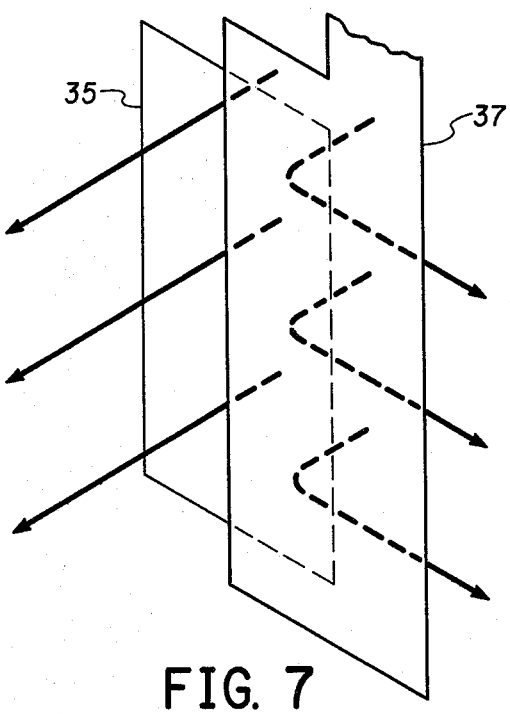
Figure 8:
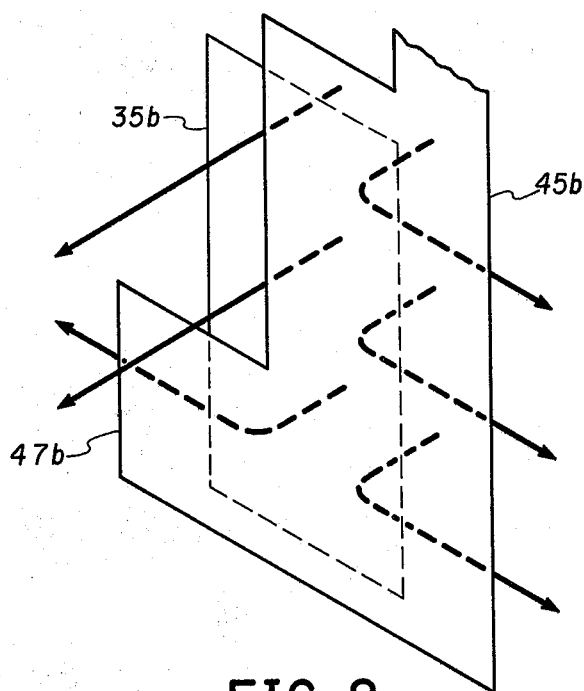

In accordance with the present invention, an improved air erected gyro features simultaneous reductions in pendulosity and air coercion error. These and other advantages, features, and objects of the invention will become more apparent upon reference to the following specification, claims, and appended drawings in which:

FIG. 1 is a perspective view of a mechanical diagrammatic representation of a typical prior art air erected vertical gyro, FIG. 2 is a partial side view showing certain items of FIG. 1 in more detail, FIG. 3 is a perspective view of a mechanical diagrammatic representation of the presently preferred inventive embodiment, FIGS. 4 and 5 are partial side views showing certain items of FIG. 3 in more detail, FIG. 6 is a perspective view showing certain items of FIG. 3 in more detail, FIGS. 7 and 8 are somewhat schematic perspective views corresponding respectively to FIGS. 2 and 4, and illustrate certain principles of operation, and FIGS. 9 through 14 are partial side views representing exemplary alternative embodiments employing the principles of the invention.

With reference now to FIG. 1, air erected gyro 11 is of conventional construction having inside inner gimbal 13 a rotor or gyro wheel (not shown) with spin axis 15. Trunnions 17 and 19, which are perpendicular to each other and also perpendicular to spin axis 15, permit, in conjunction with their mates, rotation of inner gimbal 13 relative to outer gimbal 21 and rotation of outer gimbal 21 relative to gyro frame 23. Gravity-responsive valve assemblies 25 and 27, frequently referred to in the industry as air vanes, are somewhat U-shaped physical pendulums arranged orthogonally relative to one another and suspended from inner gimbal 13 via trunnions 29 and 31 and their mates. (FIG. 6, although relating to the present invention, indicates this pendulum arrangement in more detail.)

Spin axis 15 is erected to and maintained in a vertical position by the reaction forces of four air streams produced by fan 33 and emerging from inner gimbal orifices 35a, 35b, 35c, and 35d. All four orifices are rectangular and substantially similar in size and shape. Four valve gates 37a, 37b, 37c, and 37d, the latter two being on the back side and not shown, are borne in pairs by assemblies 25 and 27, and are each arranged to confront an air stream emerging from a like-lettered, or associated, orifice. Each gate comprises an appropriately configured substantially flat surface arranged relative to its associated orifice such that for the ideal case, and when the spin axis is exactly vertical, each gate confronts substantially orthogonally one of the left or right halves (depending on direction of rotor spin) of the air stream from the associated orifice. The leading, or air stream "cutting", edges 39a, 39b, 39c, and 39d of gates 37 are each bevelled (i.e., knife-edged) on the gate side facing away from the inner gimbal. FIG. 2, which shows an orifice 35 and associated gate 37 as they ideally appear for full gyro erection, illustrates these relationships and features in enlargement.

Moreover each gate is arranged in a complementing relationship to its paired gate. That is, as one valve assembly rotates, one gate of the assembly confronts more of its associated air stream as the paired gate confronts less of its own associated air stream.

Exemplary of operation, assume that prior to erection inner gimbal 13 is oriented slightly clockwise, relative to the FIG. 1 erect position, about the axis of trunnions 17. Under such assumption, valve assembly 25 is vertical, orifice 35a is more than half open, and orifice 35c is more than half closed. The resultant reaction force on the inner gimbal is in a direction which, if the rotor were not spinning, would cause rotation about the axis of trunnion 19. However, as is well known in the art, such a force causes the spinning rotor to precess; i.e., move at a right angle relative to the force applied. Thus for the appropriate rotor spin direction, the unbalanced air forces on the inner gimbal causes the inner gimbal to rotate counterclockwise. When the spin axis is vertical the air streams discharging from orifices 35a and 35c are equal, and the net reaction force due thereto is zero. Should the inner gimbal rotate counterclockwise past vertical, the net reaction force reverses and causes the spin axis to precess back toward vertical. The spin axis is thus caused to move to and remain in a vertical position. Similar principles apply for erection about the axis of trunnion 19.

The presently preferred inventive embodiment, as diagrammatically represented in FIG. 3, comprises a Collins Divisions - Rockwell International 332D-12 vertical gyro whose valve assemblies have been modified in accordance with the present invention. Otherwise the gygos of FIGS. 1 and 3 have the same components and thus for simplification and where possible, notation employed in FIG. 3 is the same as employed at analogous locations in FIG. 1.

With reference to FIGS. 3, 4, 5, and 6, it is seen that each air stream confronting part of pendulous valve assemblies 41 and 43 comprises one of gates 45a, 45b, 45c, and 45d, and one of lateral extensions 47a, 47b, 47c, and 47d. FIG. 4 shows in more detail the configuration and interrelationship of gate 45b, extension 47b, and orifice 35b for an exactly vertical gyro condition. FIG. 4 also applies to 45d, 47d, and 35d, which are identical to 45b, 47b, and 35b respectively.

Referring to FIG. 4, gate 45b extends from outside the air stream across the entire right-hand air stream vertical boundary, beyond the orifice-bisecting vertical reference 50, to a location within the air stream indicated by line 51, so as to completely confront the entire air stream portion lying to the right of line 51. Extension 47b in the preferred embodiment is unitary with gate 45b and confronts substantially orthogonally, with a substantially flat surface, a portion of the air stream not confronted by the gate 45b. Moreover, 47b is configured to extend from outside the air stream across a part of the left-hand air stream vertical boundary to line 51 so as to completely confront approximately the lower 30% of the air stream portion lying to the left of line 51.

FIG. 5 shows in more detail the configuration and interrelationship of gate 45a, extension 47a, and orifice 35a for an exactly vertical gyro condition. FIG. 5 also applies to 45c, 47c, and 35c, which are identical to 45a, 47a, and 35a respectively. As seen in FIG. 5, gate 45a extends from outside the air stream across the entire right-hand air stream vertical boundary, beyond the orifice-bisecting vertical reference 52, to a location within the air stream indicated by line 53, so as to completely confront the entire air stream portion lying to the right of line 53. Extension 47a in the preferred embodiment is unitary with 45a and confronts substantially orthogonally, with a substantially flat surface, a portion of the air stream not confronted by the gate 45a. Moreover, 47a is configured to extend from outside the air stream across a part of the left-hand air stream vertical boundary to line 53 so as to completely confront approximately the upper 20% of the air stream portion lying to the left of line 53. The percentage of coverage by the extensions in FIGS. 4 and 5 may of course vary depending on orifice size and the desired erection rate.

Three preferred but non-essential differences between FIGS. 4 and 5, none of which alter the inventive principles involved, should be noted. Firstly, the extension in FIG. 5 is located to confront an upper portion of the air stream whereas in FIG. 4 the extension confronts a lower portion of the air stream. Secondly, the extension in FIG. 5 is arcuate along its bottom edge whereas the extension top edge in FIG. 4 is straight. Thirdly, the orifice in FIG. 5 is slightly wider than the FIG. 4 orifice. Mere convenience in manufacturing a vane like 41, whose gates each have an extension with an arcuate edge, occasioned the first of these differences. The underlying reason for the second difference is that vane 41, which controls erection in pitch, is permitted to have a greater angular swing range (i.e., ± 10°) than the roll erection vane 43 (i.e., ± 5°), mechanical stops being used to establish said ranges, that is, within the small angular movement range of vane 43, the relative movement between orifice and air stream confronting means in FIG. 4, although rotational, is close enough to strictly translational such that over the ± 5° range, the extension straight edge remains substantially horizontal and thus the effect on the desired rate of erection in roll due to deviation from true translational movement is negligible. However, with vane 41, at, for instance, 10° relative to the spin axis, the encroachment of the extension 47a on the lower parts of the air stream and the resultant reduction in erection rate is not negligible. Thus to maintain the desired pitch erection rate in the preferred embodiment, the lower edges of extensions 47a and 47c of vane 41 are curved, and more particularly, are circular arcs whose centers are located respectively at trunnion 29 and the mate to 29. The third difference is occasioned by the desirability in the presently preferred embodiment of producing a faster rate of erection in pitch than in roll.

It should here be pointed out that each air stream undergoes some deformation before reaching its associated confronting surface, but to a first approximation, since the distance between each orifice and its associated confronting surface is small (approximately 0.015 to 0.045 inches) the cross section of each air stream at its plane of confrontation may be described as approximately rectangular. That is, the boundaries of each air stream are established by and correspond approximately to the boundaries of the associated orifice. Moreover, the air stream confronting surfaces are extended sufficiently beyond the orifice boundaries to account for deformation in air stream and to assure appropriate intersection with the air stream boundaries. Also, the air stream confronting surfaces are extended sufficiently in horizontal directions to assure appropriate intersection with the air stream boundaries over the angular range in which the valves are required to operate to provide maximum erection force.

It should also be noted that each gate in the preferred embodiment extends further to the left than in the prior art. Having recognized that the clockwise spin of the fan causes the air stream velocity to peak somewhat to the left of orifice center, it was also determined that extending the gate also to the left of orifice center improves the rate of change of reaction force and results in a more sensitive gyro.

FIG. 6 illustrates the complementing relationship between each air stream confronting surface and its paired confronting surface. In the preferred embodiment, each air stream confronting means, including both the gate and the extension, are sufficiently rigid to avoid being bent by the air stream. Also note that the leading edge of each gate is preferably bevelled (at 45°) as in the prior art.

The table below in conjunction with FIGS. 4 and 5 provides several additional details of the presently preferred embodiment.

TABLE

| Parameter | Nominal Value |
| --- | --- |
| $x_1$ | 0.086 in. |
| $x_2$ | 0.184 in. |
| $x_3$ | 0.061 in. |
| $x_4$ | 0.060 in. |
| $x_5$ | 0.220 in. |
| $x_6$ | 0.220 in. |
| $x_7$ | $\geq x_1$ |
| $x_8$ | 0.015 in. |
| $x_{11}$ | 0.184 in. |
| $x_{12}$ | 0.094 in. |
| $x_{13}$ | 0.030 in. |
| $x_{14}$ | 0.035 in. |
| $x_{15}$ | 0.125 in. |
| $x_{16}$ | 0.35 in. |
| $x_{17}$ | $\geq x_{14}$ |
| $x_{18}$ | 0.35 in. |
| R (radius of curvature) | 1.351 in. |
| Pitch erection rate | 5.75 degrees/minute |
| Roll erection rate | 3.5 degrees/minute |
| Mass of pitch vane 41 | 3.1 grams |
| Mass of roll vane 43 | 2.59 grms |
| Distance from vane suspension axes to top of orifices | 1.316 in. |
| Orifice depth, or wall thickness of 13 at orifice locations | 0.078 in. |

As will become more apparent hereinbelow, the size and shape of the air stream confronting means and the length and mass of the pendulums may vary considerably from one embodiment to another and should be determined and/or verified experimentally.

Testing of the presently preferred embodiment has substantiated that simultaneous reductions in valve assembly pendulosity and vertical reference error due to air coercion may be achieved by employing the inventive principles herein. In one group of tests with the preferred embodiment, vertical reference error due to air coercion was reduced from 1.2° with the prior art embodiment to about 0.3° to 0.4° with the presently preferred embodiment, while simultaneously the valve assembly pendulosity was reduced from about 16 gm-cm to about 8.7 gm-cm. The actual reduction in pendulosity was achieved by a reduction in mass and more particularly by removal of some of the balance weights normally associated with each pendulum.

It is believed that these results are due to the extensions 47 acting as airfoils or coercive force compensators. More particularly it appears from laboratory tests that air coercion is the result of air flowing over the gate surface and generating a horizontal "drag" that forces the assembly away from true vertical. Even more particularly, and referring to FIG. 7 wherein the arrows represent air flow, it appears that a significant part of the gate confronted portion of the air stream is diverted away from the non-confronted portion so as to have a significant horizontal component to the right. The non-confronted portion probably acts somewhat like a dam, preventing diverted air flow thereacross. This diverted air flow along the gate inner surface produces a horizontal force component on the gate also to the right. This horizontal force prevents the pendulous valve assembly from functioning as a simple pendulum and results in a displacement of the assembly from true vertical. This displacement from the true vertical is the error (unwanted displacement) that is reduced by the present invention.

Due to the complementing relationship between the gates of a gate pair, there is some inherent tendency to compensate for this effect when the gyro is fully erected; i.e., exactly vertical. At this point the front and rear horizontal forces are equal and opposing. However, the tendency to inherently compensate disappears for gimbal angles off of exact vertical and thus in trying to erect itself the gyro always encounters the problem.

If the pendulosity were reduced in the prior art embodiment, then the displacement (error) from true vertical would increase because the horizontal forces on the gates would remain unchanged while the pendulous force seeking the true earth vertical would be reduced.

Referring now to FIG. 8, the gate confronted air stream portion would appear to be diverted somewhat similarly as just described for FIG. 7. However, the extension 47b diverts some air so as to have a significant component to the left. The horizontal force component thus induced is to the left and at least partially counteracts the oppositely directed force component. Thus the net or resultant horizontal force component tending to move the valve assembly away from true vertical is reduced. This compensating effect is continuous throughout a predetermined angular range from vertical of the gimbal position because $x_5$ is large enough to assure for this range that the left edge of the extension 47 remains outside the air stream. That is the left edge of extension 47 does not permit within this range a non-confronted air stream dam to form to the left of extension 47.

The principles for the FIG. 5 embodiment are the same as those just described for the FIG. 8/FIG. 4 embodiment.

As will be apparent to those skilled in the art, the inventive principles herein may be variously embodied. FIGS. 9 through 14, each of which shows a gate portion, a compensate portion, and associated orifice as related at full erection, are exemplary of such alternatives. These three components are generally designated in FIGS. 9 through 14 by G, C, and O respectively. FIG. 9 illustrates that the compensator means may be accomplished by a plurality of extensions. FIGS. 10 and 11 illustrate that the compensator portion may be configured to produce a variable compensating force which varies with angular position of the gimbal. FIGS. 12 and 13 show that the gate portion need not intersect all of one vertical boundary of the air stream and moreover indicate a way to modify the rate of erection force change as the confronting surfaces move relative to the orifice. In addition, FIG. 13 indicates that the compensator and gate portions need not be connected at a location which lies within the air stream. FIG. 14 illustrates that the orifice need not be rectangular.

Thus while particular embodiments of the present invention have been shown and described, it is apparent that changes and modifications may be made therein without departing from the invention in its broader aspects. The aim of the appended claims, therefore, is to cover all such changes and modifications as fall within the true spirit and scope of the invention.

What is claimed is:

1. In an air erected vertical gyro having a spin axis and including:
    inner and outer gimbals for permitting gyro spin axis tilt in first and second orthogonally related planes,
    air stream producing means including first, second, third, and fourth orifices sequentially oriented at substantially 90° intervals around the inner gimbal, each orifice exhausting an air stream oriented substantially at 90° relative to said spin axis and substantially parallel to one of said planes, each orifice and its associated air stream being substantially rectangular having first and second boundaries substantially parallel to said spin axis,
    first and second gravity-responsive, pendulous valve assemblies suspended from said inner gimbal so as to be rotatable relative thereto in directions substantially parallel to, respectively, said first and second planes,
    said first and second valve assemblies including respectively first and second pairs of valve gates, each one of said first pair being associated with a different one of said first and third orifices, and each one of said second pair being associated with a different one of said second and fourth orifices,
    each said gate, in response to its valve assembly's rotation relative to the inner gimbal, moving substantially orthogonally across the air stream from its associated orifice so as to variably confront said associated stream and thereby vary the associated air stream reaction force,
    each said gate cooperating with its paired gate such that as one gate causes its associated air stream reaction force to increase, the paired gate causes its associated air stream reaction force to decrease, each said gate intersecting, when the gyro is fully erected, all or part of its associated air stream's first boundary without intersecting any part of its associated air stream's second boundary, the improvement comprising four substantially flat surfaces individually associated with a different one of said four gates, each said flat surface connected for movement with its associated gate and for substantially orthogonally confronting a portion of the associated air stream not confronted by the associated gate, each said flat surface being configured to intersect, when the gyro is fully erected a part but less than all of the associated air stream second boundary.

2. Apparatus as defined in claim 1 wherein each said flat surface is configured to intersect a part but less than all of the associated air stream second boundary also when the gyro is within a predetermined angular range of full erection.

3. An air erected gyro having a spin axis and comprising:

at least one gimbal for permitting variation of the spin axis orientation in at least one plane, means for producing two collinear and oppositely directed air streams which provide the forces for precessing said gyro, each said air stream having first and second boundaries which, when the gyro is fully erected, are horizontally displaced in opposing directions from a vertical reference plane, a gravity-responsive vertical-seeking valve assembly for simultaneously controlling in a complementing relationship the reaction force magnitudes of said two air streams, said valve assembly including two air stream confronting means which are movable in unison so as to individually cross different ones of said streams, each said air stream confronting means comprising a valve gate portion and, connected for movement therewith, an airfoil portion, each said valve gate portion being configured so as to extend, when the gyro is fully erected, from outside its associated air stream across a portion or all of its associated air stream first boundary to a location inside its associated air stream, each said airfoil portion being configured so as to extend, when the gyro is fully erected, from outside its associated air stream across a portion of its associated air stream second boundary to a location inside its associated air stream.

4. Apparatus as defined in claim 3 wherein the cross sections of said two air streams are substantially identical to one another, and the configurations of the two air stream confronting means are substantially identical to one another.

5. Apparatus as defined in claim 4 wherein the cross section of each said air stream is substantially rectangular and oriented such that when the gyro is fully erected, two sides of the rectangular cross section are substantially vertical, one vertical side corresponding to the air stream first boundary and the other vertical side corresponding to the air stream second boundary.

6. Apparatus as defined in claim 3 wherein said plane in which the spin axis orientation may vary is vertical and substantially orthogonal to said vertical reference plane.

7. In an air erected gyro of the type including an erection-force producing air stream and associated gravity-responsive valve means having a gate portion movable transversely relative to the associated air stream so as to variably confront said stream and divert at least some of the gate confronted portion away from the non-confronted portion, the improvement comprising compensator means, connected with said gate and also confronting said stream, for at least partially counteracting, by diverting some air not confronted by said gate portion, the horizontal coercive effects of the gate diverted air on the valve means position.

8. Apparatus as defined in claim 7 wherein the gate portion and the compensator means comprise substantially flat surfaces oriented to confront said stream substantially orthogonally.

9. In an air erected gyro of the type including an erection-force producing air stream and associated gravity-responsive, air stream confronting means movable relative to the associated air stream in a plane transverse thereto for variably confronting said stream and thereby varying the erection-force magnitude, a method for reducing vertical reference error caused by air coercion comprising confronting and diverting a part of the air stream such that the diverted air has opposing horizontal components in the plane of said confronting means movement.

* * * * *